Sept. 10, 1929.  P. D. ANDREWS  1,728,028

VARIOMETER

Filed April 7, 1928

Inventor:
Paul D. Andrews,
by Charles V. Tullar
His Attorney.

Patented Sept. 10, 1929.

1,728,028

UNITED STATES PATENT OFFICE.

PAUL D. ANDREWS, OF SCHENECTADY, NEW YORK, ASSIGNOR TO GENERAL ELECTRIC COMPANY, A CORPORATION OF NEW YORK.

VARIOMETER.

Application filed April 7, 1928. Serial No. 268,301.

My invention relates to variometers and more particularly to the arrangement of the windings thereof. It has for its purpose to provide a variometer which, when connected in combination with a fixed condenser to constitute an oscillatory circuit, may have a more nearly linear frequency characteristic than variometers as heretofore constructed.

Figure 1:
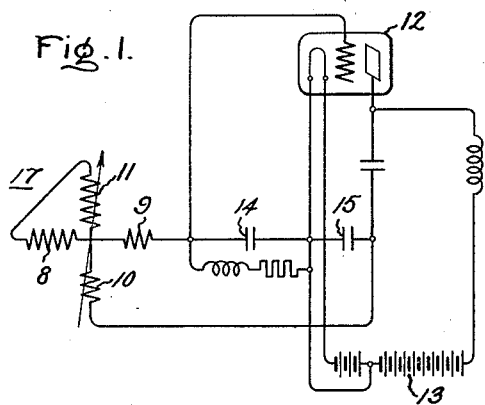
Figure 2:
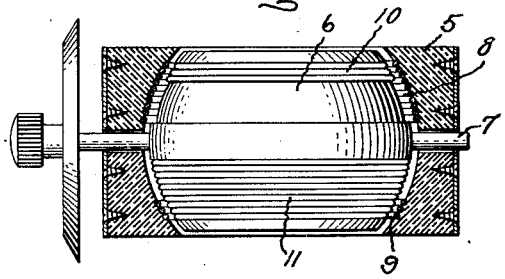

The novel features of my invention will be set forth with particularity in the appended claims. My invention itself, however, may best be understood by reference to the following specification taken in connection with the accompanying drawing in which Fig. 1 shows a circuit in which the variometer may be employed; Fig. 2 illustrates a variometer constructed in accordance with my invention and Fig. 3 represents the nature of improvement in the characteristics resulting from my invention.

The most common form of variometer now employed in high frequency signaling systems comprises a movable inductance coil placed in variable inductance relationship to a second fixed inductance coil. These coils may be connected either in parallel or in series. When connected in series the inductance of the variometer is equal to the self-inductance of the stator plus the self-inductance of the rotor plus or minus the mutual inductance between the two windings. Thus when the two windings are so placed that the current through them passes through both windings in the same direction with respect to the axes, the windings are said to be in the aiding position and the self-inductance of the two windings is increased by the mutual inductance between them to produce the total inductance of the variometer. Conversely, when the coils are so placed, as when the movable coil has been rotated from the former position through 180° that a current passing through them passes through the rotor and stator windings in opposite directions, they are said to be in the "opposing" position and in this case the self-inductance of the two windings is diminished by their mutual inductance to produce the total inductance of the variometer.

A variometer, as described in the foregoing description, is generally arranged in such a manner that the rotor may be rotated through an angular displacement of substantially 180° and a maximum mutual inductance is realized in both the aiding and the opposing positions. The mutual inductance in both of these positions is about equal. Assuming the rotor to be in the aiding position when the maximum mutual inductance is realized a curve may be plotted between the total inductance of the variometer and the angular displacement of the rotor. As variometers are ordinarily constructed this curve would approximate a straight line similar to curve 1 of Fig. 3 of the accompanying drawing. That is, the total inductance of the variometer becomes nearly a linear function of the angular position of the rotor. Such variometers are ordinarily used in conjunction with a fixed capacity for the purpose of tuning an electric circuit. Thus each angular displacement of the rotor corresponds to some frequency at which the inductance of the variometer and capacity of the fixed condenser resonate. Assuming the inductance curve of the variometer to be approximately that represented by curve 1 of Fig. 3 of the drawing, the frequency calibration curve for the inductance and capacity combination will approximate curve 2 of Fig. 3.

Figure 3:
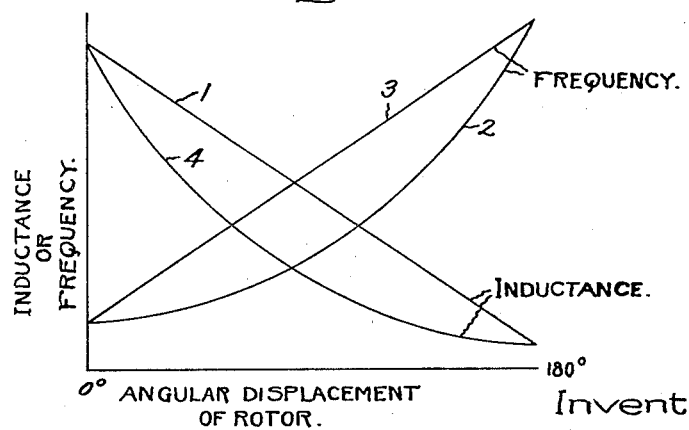

Both the inductance and frequency curves on Fig. 3 are plotted, for the purpose of illustrating the nature of the improvement, against arbitrary scales of frequency and inductance, with the angular displacement of the variometer plotted as the abscissa. A consideration of curve 2 will show that the rate of change of frequency with respect to the angular adjustment of the rotor, as represented by the shape of curve 2, progressively varies from the lower portion of the curve to the higher portion of the curve, corresponding to an angular displacement of the rotor through 180°. Due to this fact the frequency calibration of most variometers is spread out greatly at one end of the scale and is considerably crowded at the other end. In many applications of variometers this is objectionable in that it affects adversely the accuracy to which the circuit may be readjusted to resonate at a predetermined frequency.

In order that the calibration of the variometer may be linear over the entire range of angular adjustment of the rotor it is desirable that its frequency characteristic should be similar to that shown at 3 in Fig. 3. To attain this the inductance of the variometer should vary substantially in accordance with the curve 4 of the figure. It will be noted that curve 4 differs from curve 1 in that the rate of change in inductance with reference to the angular displacement of the rotor progressively varies in a manner to provide a more nearly linear frequency characteristic.

In accordance with my invention I provide that the sections of the stator and rotor windings on opposite sides of the shaft which support the rotor, shall comprise substantially different numbers of turns, as is indicated by Fig. 2 of the drawing. In this figure 5 indicates the stator member and 6 the rotor member. The rotor member is arranged within the stator member and is adapted for rotation about an axis which may be represented as the shaft 7. As illustrated the interior of the stator member and the exterior of the rotor member are substantially spherical. Mounted about the inner periphery of the stator member is a winding which is divided into sections 8 and 9, these sections being spaced apart and arranged upon opposite sides of the shaft 7 and the former comprising a substantially greater number of turns than the latter. Similarly, the rotor winding is mounted about the outer periphery of the member 6 and is divided into sections 10 and 11 on opposite sides of the shaft 7, the latter having a substantially greater number of turns than the former.

With the rotor in the position shown in the drawing it will be seen that the winding 11 of the rotor, which comprises the larger number of turns, is in close inductive relation with the winding 9 of the stator which comprises a comparatively few number of turns, whereas the section 10 of the rotor winding is in close inductive relation with section 8 of the stator winding. In this position the sections 8 and 11 are in loose inductive relationship. If we now rotate the rotor through 180° the section 11 of the rotor winding will be in close inductive relation with the stator winding 8, both of these sections of windings having a large number of turns. Similarly windings 9 and 10, which have the smaller number of turns, will be in close relation and as a result a closer inductive relation between the stator and rotor windings as a whole will be had. It will be seen that in this latter position the mutual inductance of the windings will be considerably greater than in the former position. Thus during the first increments of angular displacement of the rotor from the position shown in the drawing, the change in inductance will be comparatively small as is represented by the lower portion of the curve 4, and will progressively increase as the rotor is displaced through 180°. With this progressively increasing change in inductance of the variometer it will be seen that a more nearly linear frequency characteristic of the resonant circuit, in which the variometer is connected, will be had.

In Fig. 1 I have shown a circuit of a typical oscillation generator which may be employed in a high frequency transmitter and in which my variometer may be advantageously employed. This oscillation generator comprises an electron discharge device 12 having an anode which is energized from an energy source 13, a cathode and a grid. Between the anode and the grid is connected the usual oscillatory circuit comprising fixed condensers 14 and 15 which are connected in parallel relation with the variometer 17 which is of the type shown in Fig. 2, the windings of the variometer being numbered in accordance with the numerals applied thereto in Fig. 2. By adjusting the angular position of the rotor of the variometer 17 of Fig. 1 the oscillations produced will vary in an approximately linear relation with the angular position of the rotor.

What I claim as new and desire to secure by Letters Patent of the United States is:

1. In a variometer, a stator member, a rotor member, said rotor member being rotatable through a position in which the axes of said members are transverse, inductively related windings disposed upon both of said members in materially unsymmetrical relationship with the axis of rotation of said rotor member, whereby upon rotation of said rotor member through a predetermined arc the rate of change of inductance of said windings will progressively vary.

2. In a variometer, a stator member, a rotor member, inductively related windings disposed about the periphery of said members the windings on each member being arranged in unequal sections and spaced apart, means for rotating the rotor about an axis extending between the sections on both members whereby the rate of change of inductance of said windings progressively varies as the rotor is rotated in either direction.

3. In a variometer, a stator member, a rotor member, inductively related windings disposed upon both of said members in unsymmetrical relationship with the axis of rotation of said rotor member, a condenser connected in parallel with said windings, whereby the relation between the frequency at which the inductance of said windings and the capacity of said condenser are in resonance and the angular position of the rotor is approximately linear.

4. In a variometer, a stator member, a rotor member, inductively related windings disposed about the periphery of said members, the windings on each member being arranged in sections and spaced apart, the number of turns in one section on each member being substantially greater than that in another section, means for rotating said rotor about an axis extending between the unequal sections on both members whereby in one position of the rotor, sections on both members having the greater number of turns are in close inductive relation whereas in another position of said rotor said sections are in loose inductive relation and the section having the greater number of turns on each member is in close inductive relation with the section on the other member having the lesser number of turns.

5. In a variometer, a stator member having a substantially spherical interior surface, a rotor member having a substantially spherical exterior surface, arranged within said stator member, windings arranged upon said exterior surface and interior surface in substantially parallel space relation when said rotor is in either of two positions the windings on both members being disposed in sections on opposite sides of the axis of rotation of said rotor, said sections on each member having substantially different numbers of turns and means for rotating said rotor from one of said two positions to the other.

6. In a variometer, a stator member, a rotor member arranged within the stator member and adapted for rotation through substantially one hundred and eighty degrees, inductively related windings disposed upon both of said members in materially unsymmetrical relationship with the axis of rotation of the rotor member, whereby the mutual inductance between said stator and rotor windings when the rotor is in substantially reversed positions is materially different.

In witness whereof, I have hereunto set my hand this 6th day of April, 1928.

PAUL D. ANDREWS.